United States Patent
Matsuoka et al.

[19]

[11] Patent Number: 5,845,029
[45] Date of Patent: Dec. 1, 1998

[54] OPTICAL CONNECTOR HAVING MEANS FOR POSITIONING TILTED CONVEX SURFACE OF FERRULE

[75] Inventors: Yoshihiro Matsuoka; Nobutoshi Takeda; Tohru Mizuhashi, all of Chiba; Noriaki Tokuda; Seiji Takemoto, both of Tokyo; Shigeru Ohmori, Chiba, all of Japan

[73] Assignees: Emit-Seiko Co., Ltd.; Hitachi Plant Engineering & Construction Co., Ltd., both of Japan

[21] Appl. No.: 764,211

[22] Filed: Dec. 13, 1996

[30] Foreign Application Priority Data

Dec. 19, 1995 [JP] Japan ..................... 7-354846

[51] Int. Cl.⁶ ........................................ G02B 6/38
[52] U.S. Cl. ................... 385/84; 385/68; 385/85; 385/86
[58] Field of Search .................. 385/68, 76–78, 385/84–86, 66, 67

[56] References Cited

U.S. PATENT DOCUMENTS

| | | | |
|---|---|---|---|
| 4,752,111 | 6/1988 | Fisher | 385/68 X |
| 5,091,990 | 2/1992 | Leung et al. | 385/84 X |
| 5,136,681 | 8/1992 | Takahashi | 385/66 X |
| 5,142,598 | 8/1992 | Tabone | 385/78 |
| 5,146,525 | 9/1992 | Tabone | 385/78 |
| 5,321,784 | 6/1994 | Cubukciyan et al. | 385/78 |
| 5,396,572 | 3/1995 | Bradley et al. | 385/78 |
| 5,515,466 | 5/1996 | Lee | 385/78 |
| 5,633,970 | 5/1997 | Olson et al. | 385/78 |

FOREIGN PATENT DOCUMENTS

| | | |
|---|---|---|
| 266780A2 | 5/1988 | European Pat. Off. . |
| 266780A3 | 5/1988 | European Pat. Off. . |
| 432947A1 | 6/1991 | European Pat. Off. . |
| 638828A1 | 2/1995 | European Pat. Off. . |
| 61-77810 | 4/1986 | Japan . |
| 1-121805 | 5/1989 | Japan . |
| 4-116604 | 4/1992 | Japan . |
| 4-93805 | 8/1992 | Japan . |
| 7-77630 | 3/1995 | Japan . |
| WO 9637793 | 11/1996 | WIPO . |

OTHER PUBLICATIONS

Patent Abstracts of Japan, vol. 013, No. 361 (P–917) Aug. 11, 1989.

*Primary Examiner*—John D. Lee
*Attorney, Agent, or Firm*—Adams & Wilks

[57] ABSTRACT

An optical fiber connector comprises a first tubular body having a passageway extending generally longitudinally therethrough for receiving an optical fiber, a first end for connection to an adaptor and being polished into a tilted convex surface, and a second end. A second tubular body has a passageway extending generally longitudinally therethrough in substantial coaxial alignment with the passageway of the first tubular body for receiving the second end of the first tubular body. A positioning device integral with the second tubular body is provided for positioning a tilt direction of the tilted convex surface of the first tubular body in a predetermined registered position when the first end of the first tubular body is connected to the adaptor.

1 Claim, 4 Drawing Sheets

OPTICAL CONNECTOR HAVING MEANS FOR POSITIONING TILTED CONVEX SURFACE OF FERRULE

BACKGROUND OF THE INVENTION

The present invention relates to the construction of an optical connector used in optical communication for coupling one optical fiber to another optical fiber. More specifically, the invention relates to a positioning structure of the optical fiber.

In connecting an optical fiber cable as communication media, it is necessary to limit a concentric error below several μm between a pair of optical fibers at a connecting portion. Normally, a tip end of each optical fiber is fitted into a connector and is polished. Respective polished tip ends of the pair of the optical fibers are point-contacted with each other by means of the connectors with certain urging force. FIG. 2 shows a schematic coupling structure of the optical fibers. A sleeve 101 is disposed within an adaptor 123 in a free state. A pair of left and right connectors are coupled to each other by means of the central adaptor 123. The left connector is composed of a ferrule 109A which receives therethrough one optical fiber 110A. A tip end portion of the ferrule 109A is inserted into the sleeve 101. A rear end portion of the ferrule 109A is fixed to the adaptor 123 by means of a coupling nut 124A. The right connector has the same construction such that another optical fiber 110B is inserted into a ferrule 109B. A tip end portion of the ferrule 109B is inserted into the sleeve 101 from an opposite direction. A rear end portion of the ferrule 109B is fixed to the adaptor 123 by means of a coupling nut 124B. A stopper 125 is disposed in an internal space of the adaptor 123 to restrict axial displacement of the sleeve 101.

By such a manner, each optical fiber is fitted into the connector at the tip end portion of the optical fiber. The pair of the fibers are point-contacted with each other at the respective tip ends by means of the connectors. In this connecting structure, the tip end of the ferrule is processed in a convex spherical face to enable direct contact between the pair of the fibers so as to suppress a coupling loss and a reflective attenuation. In the prior art, the convex spherical processing is generally applied to a vertical end of the ferrule. Recently, the end of the ferrule has been processed by polishing in a tilted convex face. Such a technique is disclosed, for example, in Japanese Patent Laid-open No. hei 1-121805. As shown in FIG. 3, each ferrule f is polished in the tilted convex face at a tilt angle of 8° for instance to connect one ferrule to another ferrule. The tip end of each ferrule f is spherically polished around a curvature center C which is deviated from an optical axis L of an optical fiber s at an angle of 8° for instance so as to form the tilted convex face. The respective tilted convex faces q of the pair of the ferrules are urged in abutment with each other to connect the pair of the optical fibers s to each other. By this construction, the coincidence of the optical axes of the fibers s is improved to thereby reduce reflected return light. The reflected return light at the end of the optical fiber is reduced more than 50% as compared to the vertical convex spherical polishing. Therefore, the tilt polishing can reduce coupling noise and is suitable for use in optical connection of CATV and other picture data transfer. However, in contrast to the vertical convex polishing, it is necessary in the tilted convex polishing that a line connecting between the pair of the curvature centers C accurately passes at the contact point between the pair of the ferrules f. Therefore, it is necessary to precisely determine the circumferential position of the respective ferrules f.

The optical connector is one of commonly used parts, and is therefore fabricated according to an established standard. FIG. 4 shows a detailed structure of the conventional optical connector designed according to Japan Industrial Standard (JIS). As shown in the figure, the optical connector receives thereinto a cord 201 from an axially rear end portion so that an optical fiber 202 enclosed in the cord 201 is led to a front end portion of the connector. The fiber 202 is supported and fixed by a ferrule 203. The ferrule 203 is polished at a tip end thereof and is engaged with a flange 204 at a rear end of the ferrule 203. The ferrule 203 and the flange 204 are accommodated in a plug frame 205. A key ring 206 is mounted around an outer periphery of the plug frame 205. The key ring 206 includes a key 207 which is engageable with a key recess of an adaptor (not shown) to determine the circumferential position or orientation of the ferrule 203. A stopper 208 is fitted to the rear end portion of the plug frame 205 by screwing. A spring member 209 is disposed between the flange 204 and the stopper 208 to urge the ferrule 203 in the axially forward direction. A horn 210 is formed at the front end of the stopper 208, and is engaged into a recess of the flange 204 to restrict rotational movement of the ferrule 203 in the circumferential direction. A holder 211 is fitted to the rear end portion of the stopper 208 by screwing. The holder 211 guides the cord 201. A ring 212 is disposed between the holder 211 of an outer sleeve and the stopper 208 of an inner sleeve so as to reinforce the fixing of the cord 201. The holder 211 is covered by a rubber hood 213. A coupling nut 214 is mounted around an outer periphery of the plug frame 205, and is screwed with an adaptor (not shown) to secure the coupling of the optical connector. A washer 215 is interposed between the plug frame 205 and the coupling nut 214.

First, the conventional optical connector has a drawback that the connector assembly is made up of many number of components which hinder cost reduction. The conventional optical connector is composed of more than ten number of components including the ferrule 203 made of ceramics, the flange 204 made of metal, the plug frame 205, the key ring 206, the stopper 208, the spring member 209, the holder 211, the ring 212, the rubber hood 213, the coupling nut 214 and so on. The cost reduction is made difficult because of such a great number of the components.

Second, assembling work is complicated due to the many number of the components to thereby disadvantageously require considerable assembling steps. Particularly as denoted by A1–A5 in FIG. 4, the assembling work contains adhesion processes at a plurality of points which prolong the assembling work time. For example, A1 denotes an adhesive point of the fiber 202 within the ferrule 203. A2 denotes an adhesive point between the plug frame 205 and the stopper 208. A3 denotes an adhesive point between the stopper 208 and the holder 211. A4 denotes an adhesive point between the stopper 208 and the ring 212. A5 denotes an adhesive point between the cord 201 and the rubber hood 213.

Third, there is a drawback that positioning of the ferrule is inaccurate and an accuracy of the fiber connection is poor. This causes serious defects particularly in connecting a ferrule having the tilted convex face at the polished tip end thereof. This drawback is briefly discussed with reference to FIGS. 5 and 6. FIG. 5 schematically shows engagement relation between the flange 204 and the stopper 208. As noted before, the flange 204 is fixed to the rear end portion of the ferrule 203. Four recesses 204a are formed on the outer periphery of the flange 204. On the other hand, a pair of horns 210 are formed at the front end portion of the stopper 208. When the flange 204 and the stopper 208 are coupled to each other, the horn 210 engages with the recess 204a to restrict the rotation of the ferrule 203 in the circumferential direction thereof. However, the recess 204a has a width in the order of 1.5 mm, while the horn 210 has a width in the order of 1.0 mm. There is a play in the order of 0.5 mm between the recess 204a and the horn 210. The ferrule 203 may deviate in the circumferential direction due to the play. Thus, it is difficult to accurately register the angular position of the ferrule. Such a deviation causes the serious drawback particularly if the ferrule is polished in the tilted convex face.

FIG. 6 shows engagement relation between the key ring 206 and the plug frame 205. The key ring 206 is fitted on the outer periphery 205a of the plug frame 205. The key ring 206 is made of metal material and is formed with the key 207 at the front end. Further, a pair of claws 206a are formed at the rear end of the key ring 206. On the other hand, recesses 205b are formed in a flange of the plug frame 205. When the key ring 206 is coupled to the plug frame 205, the claws 206a engage with the recesses 205b so as to restrict angular displacement of the key ring 206. However, there is a certain clearance between the claw 206a and the recess 205b causing a play which affects positional accuracy of the key ring 206. Further, the key 207 is locked into a recess of an adaptor (not shown) for the positioning. However, the key ring 206 is formed from a thin metal plate which may cause elastic deformation of the key 207, resulting in further degradation of the positional accuracy.

SUMMARY OF THE INVENTION

The present invention is directed to solve the above noted drawbacks of the prior art. The inventive optical connector is used to connect an optical fiber protruding from a cord tube through a buffer tube to an adaptor. The optical connector is basically composed of a ferrule, a plug frame, a spring member, a clamp ring and a coupling nut. The ferrule is composed of a capillary and a flange integrated with the capillary. The capillary axially guides therethrough the optical fiber which protrudes from the buffer tube, and has a polished tip end portion and a rear end portion which is axially spaced from the tip end portion. On the other hand, the flange is fixed to the rear end portion of the capillary, and has a key projection engageable with a key recess of the adaptor to determine circumferential position of the ferrule, and a guide sleeve extending rearward from the rear end portion of the capillary to receive therein the buffer tube. The plug frame has a front sleeve for accommodating therein the flange of the ferrule and a rear sleeve extending axially rearward from the front sleeve to guide therethrough the buffer tube. The spring member is interposed between the flange of the ferrule and the front sleeve of the plug frame for urging the capillary axially forward. The clamp ring is engaged around an outer periphery of the rear sleeve of the plug frame, and is engaged with a tip end portion of the cord tube to thereby firmly connect the rear sleeve and the cord tube with each other. The coupling nut is mounted around an outer periphery of the plug frame and is screwed with the adaptor to thereby couple the plug frame to the adaptor. Preferably, the capillary has the tip end portion which is polished in a tilted convex face such that a tilt direction of the tilted convex face is registered with circumferential position of the key projection.

According to the invention, the optical fiber is basically composed of five parts including the ferrule, the plug frame, the spring member, the clamp ring and the coupling nut. The number of the parts is reduced by half as compared to the prior art to thereby reduce the cost and shorten the assembling steps. Further, according to the invention, the above listed parts or elements are basically integrated with each other without use of adhesive to thereby simplify the assembling process. Specifically, the plug frame and the cord tube are coupled to each other by means of the clamp ring to thereby realize a reinforced structure having sufficient mechanical strength. Therefore, any external force imposed on the cord tube may not affect the buffer tube and the optical fiber. Further, the capillary and the flange are integrated with each other to constitute the ferrule. The flange is formed integrally with the key projection having good rigidity. The key projection is engaged with the key recess of the adaptor without substantial elastic deformation to thereby significantly improve accuracy of the angular positioning of the ferrule.

DETAILED DESCRIPTION OF THE INVENTION

Figure 1:
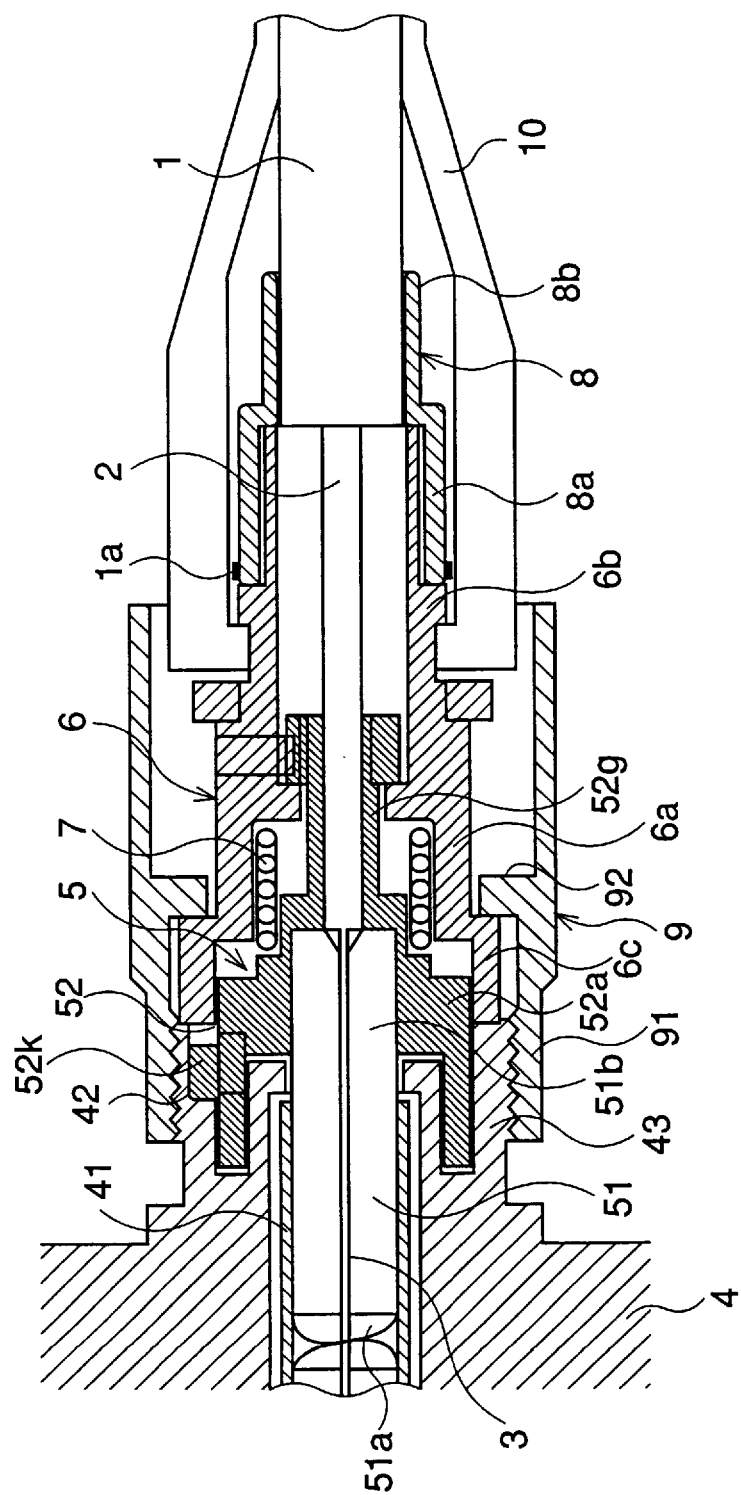
FIG. 1 is a sectional diagram schematically showing the structure of an optical connector according to the invention.
Figure 2:
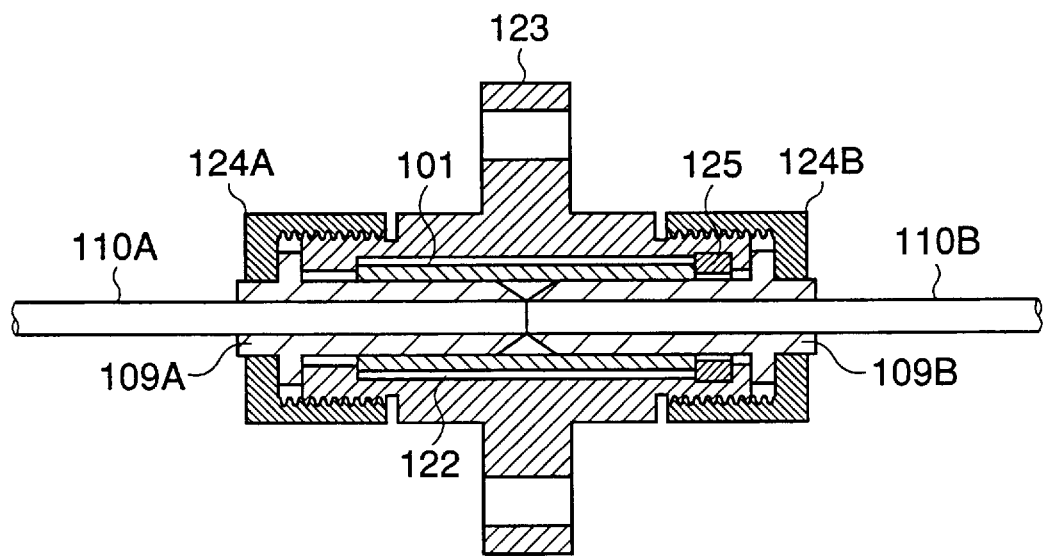
FIG. 2 is a sectional diagram schematically showing a coupling state of a conventional optical connector.
Figure 3:
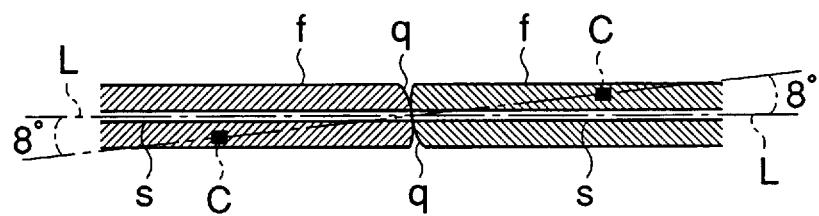
FIG. 3 is a sectional diagram schematically showing a contact state of ferrules polished in a tilted convex face.
Figure 4:
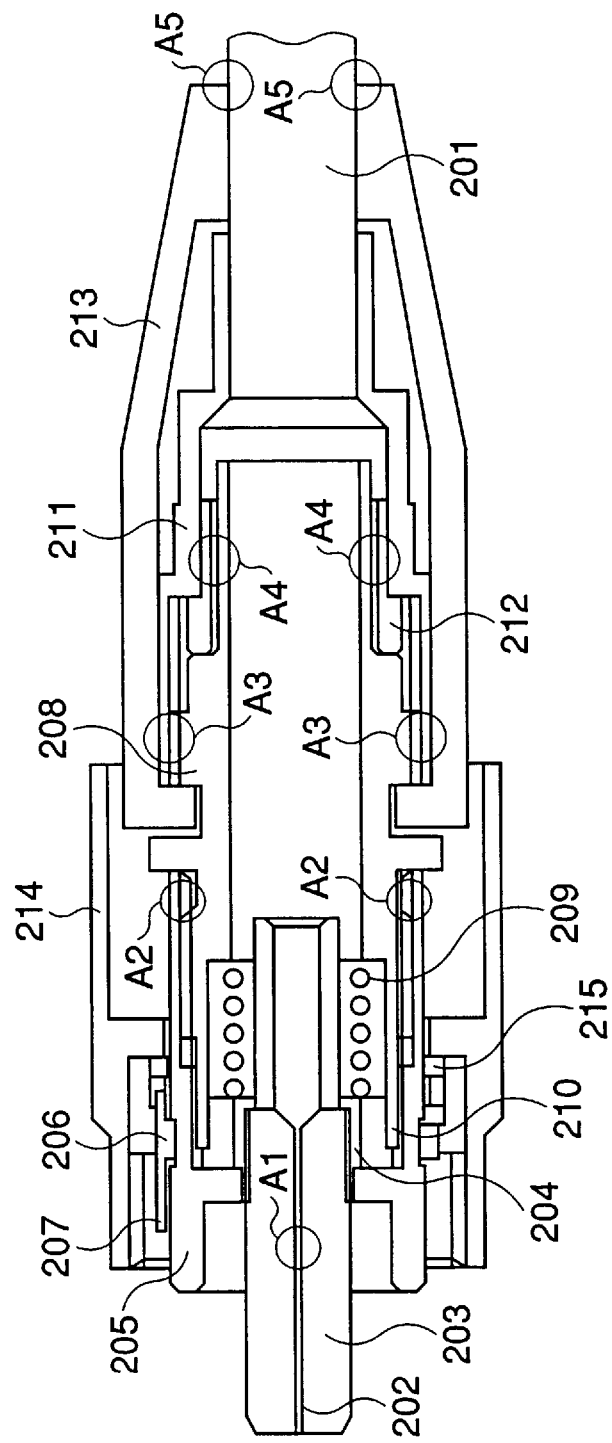
FIG. 4 is a schematic sectional diagram showing another conventional optical connector.
Figure 5:
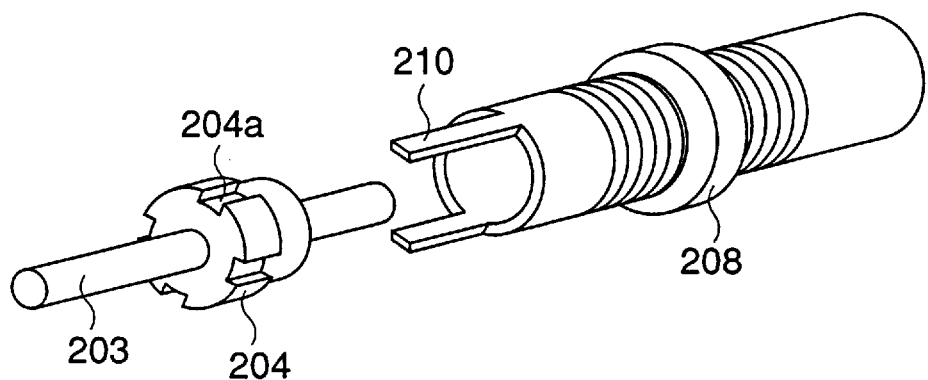
FIG. 5 is an exploded perspective view of the conventional optical connector.
Figure 6:
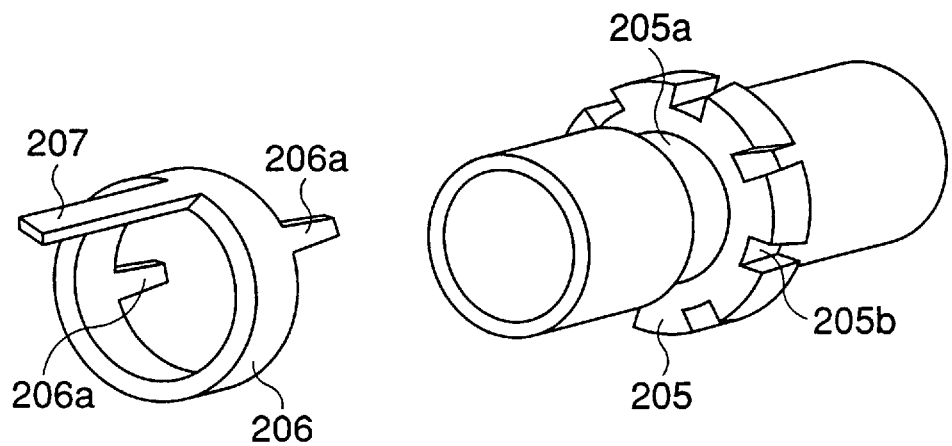
FIG. 6 is another exploded perspective view of the conventional optical connector.

Hereinafter, a most preferred embodiment of the inventive optical connector is described in detail with reference to FIG. 1. As shown in the figure, the optical connector is used to connect an optical fiber 3 protruding from a cord tube 1 through a buffer tube 2 to an adaptor 4. Namely, the optical cable connected by means of the optical connector has a triple layer structure composed of the inner fiber 3, the intermediate buffer tube 2 and the outer cord tube 1. The outer cord tube 1 (cord cover) is inserted into a rear end of the optical connector, and the inner fiber 3 is guided to a front end of the optical connector. The optical connector is basically composed of a ferrule 5, a plug frame 6, a biasing member 7, a clamp ring 8, and a coupling nut 9.

The ferrule 5 is composed of a first tubular body or capillary 51 and a second tubular body or flange 52, which are integrated with each other. The capillary 51 is made of ceramic, and axially guides therethrough the optical fiber 3 which protrudes from the buffer tube 2. The fiber 3 is fixed in a through-hole of the capillary 51 by means of an adhesive. The capillary 51 has a polished tip end portion 51a and a rear end portion 51b which is axially spaced from the tip end portion 51a. In this embodiment, the tip end portion 51a of the capillary 51 is polished in a tilted convex spherical face. The capillary 51 is inserted into a precise sleeve 41 which is accommodated in the adaptor 4. The tip end portion 51a of the capillary 51 is brought into point contact with an opposed tip end portion of another capillary within the sleeve 41. On the other hand, the flange 52 is made of metal material, and is fixed to the rear end portion 51b of the capillary 51. By such a manner, according to the invention, the capillary 51 made of ceramic and the flange 52 made of metal are integrated with each other to constitute the ferrule 5 so as to improve the assembling feature as compared to the prior art. The flange 52 has an outer circumferential wall portions 52a and a key projection 52k at an outer periphery thereof. The key projection 52k is engageable with a key recess 42 of the adaptor 4 to determine the angular or circumferential position of the ferrule 5. The key projection 52k is formed integrally with the flange 52, and has a rigidity sufficient to prevent elastic deformation when the key projection 52k is engaged with the key recess 42. The key projection 52k realizes accurate positioning of the tilt direction of the tip end portion 51a which is polished in the tilted convex face. In addition to the key projection 52k, the flange 52 is provided with a guide sleeve 52g which extends rearward from the rear end portion of the capillary 51 to receive and guide the buffer tube 2.

The plug frame 6 defines a third tubular body and 6 is divided into a front sleeve 6a and a rear sleeve 6b. The front sleeve 6a accommodates therein the flange 52 of the ferrule 5. The rear sleeve 6b extends axially rearward from the front sleeve 6a to guide the buffer tube 2. The biasing member 7 is interposed between the flange 52 of the ferrule 5 and the front sleeve 6a of the plug frame 6 for urging the capillary 51 in the axially forward direction. The clamp ring 8 is engaged around an outer periphery of the rear sleeve 6b of the plug frame 6, and is also engaged with a tip end portion of the cord tube 1 to firmly joint the rear sleeve 6b and the cord tube 1 with each other. The clamp ring 8 has a forward portion 8a having a relatively large inner diameter and a rearward portion 8b having a relatively small inner diameter. The forward portion 8a clips a kevlar 1a of the cord tube 1 between an inner periphery of the forward portion 8a and an outer periphery of the rear sleeve 6b of the plug frame 6. The forward portion 8a is fixed to the rear sleeve 6b by clamping. On the other hand, the rearward portion 8b of the clamp ring 8 receives therein the cord tube 1 and is fixed thereto by clamping. By such a manner, the top end of the cord tube 1 is firmly held to achieve mechanical reinforcement. The clamp ring 8 is entirely covered by a rubber hood 10. The coupling nut 9 is mounted around an outer periphery of the plug frame 6, and is screwed with the adaptor 4 to couple the plug frame 6 to the adaptor 4. In detail, the adaptor 4 is formed with a bolt portion 43 which protrudes from an end of the adaptor 4. A nut portion 41 of the coupling nut 9 is engaged with the bolt portion 43 by screwing. By such a manner, a flange 6c of the front sleeve portion 6a of the plug frame 6 is pressed to the end of the bolt portion 43 of the adaptor 4 by means of a step portion 92 of the coupling nut 9. Thus, the plug frame 6 is firmly coupled to the adaptor 4. On the other hand, the integral ferrule 5 composed of the capillary 51 and the flange 52 is separated from the plug frame 6 in a free state, and is simply urged toward the adaptor 4 by means of the biasing member 7 in the form of a coil spring.

As described above, according to the invention, the optical connector is composed of the ferrule, the plug frame, the biasing member, the clamp ring and the coupling nut. The number of the components is reduced by half as compared to the prior art connector to thereby achieve cost reduction. Further, these components are assembled together without use of adhesive to thereby advantageously shorten assembling work time as compared to the prior art. Moreover, the ferrule is formed with the key projection having the sufficient rigidity. The key projection is engaged with the key recess of the adaptor to accurately position the ferrule in the circumferential direction. This is particularly suitable for connecting the capillary treated by tilted convex polishing.

What is claimed is:

1. An optical connector for connecting an optical fiber protruding from a cord tube through a buffer tube to an adaptor, the optical connector comprising:

a ferrule composed of a capillary and a flange integrated with the capillary, the capillary axially guiding therethrough the optical fiber which protrudes from the buffer tube and having a tip end portion polished into a tilted convex surface for Positioning in a predetermined registered position and a rear end portion which is axially spaced from the tip end portion, the flange being fixed to the rear end portion of the capillary and having a key projection engageable with a key recess of the adaptor in a circumferential position therein such that a tilt direction of the tilted convex surface of the ferrule is positioned in the predetermined registered position when the key projection is in the circumferential position to thereby determine a circumferential position of the ferrule, the flange having a guide sleeve extending rearwardly from the rear end portion of the capillary for receiving therein the buffer tube;

a plug frame having a front sleeve for accommodating therein the flange of the ferrule and a rear sleeve extending axially rearwardly from the front sleeve to guide therethrough the buffer tube;

a spring member interposed between the flange of the ferrule and the front sleeve of the plug frame for urging the capillary axially forward;

a clamp ring engaged around an outer periphery of the rear sleeve of the plug frame and being engaged with a tip end portion of the cord tube to thereby firmly connect the rear sleeve and the cord tube with each other; and a coupling nut mounted around an outer periphery of the plug frame and being connected to the adaptor to thereby couple the plug frame to the adaptor.

* * * * *